United States Patent [19]

Furukawa

[11] Patent Number: 5,437,698
[45] Date of Patent: Aug. 1, 1995

[54] PARTICULARLY, A STRUCTURED BODY FOR THE DRAINAGE TREATMENT FOR THE PREPARATION FOR TREE-PLANTING GROUND, AND ITS IMPOUNDING AND FLUSHING SYSTEM

[75] Inventor: Sadaishi Furukawa, Tsukuba, Japan

[73] Assignee: Yugen Kaisha Clean Up System, Tsukuba, Japan

[21] Appl. No.: 273,631

[22] Filed: Jul. 12, 1994

Related U.S. Application Data

[62] Division of Ser. No. 997,350, Dec. 28, 1992, Pat. No. 5,373,661.

[30] Foreign Application Priority Data

Apr. 24, 1992 [JP] Japan .................... 4-33911

[51] Int. Cl.⁶ ............................ A01G 9/02; E04C 2/34
[52] U.S. Cl. ........................................ 47/66; 47/1.01; 52/302.1; 52/791.1
[58] Field of Search ................ 52/801, 808, 810, 800; 47/1 F, 66 S

[56] References Cited

U.S. PATENT DOCUMENTS 2,970,373 2/1961 Kohl ................................ 52/800
3,161,265 12/1964 Matsch ............................ 52/808

FOREIGN PATENT DOCUMENTS

| 150122 | 8/1953 | Australia | 52/808 |
| 266701 | 5/1988 | European Pat. Off. | 47/66 S |
| 3507563 | 9/1986 | Germany | 47/66 S |
| 4-99414 | 3/1992 | Japan | 47/66 S |
| 5-284857 | 11/1993 | Japan | 47/66 S |

Primary Examiner—Henry E. Raduazo
Attorney, Agent, or Firm—Ladas & Parry

[57] ABSTRACT

The present invention is a structured body for drainage treatment which is an unit box composed of a top panel having multiple weep holes and downward cylinders provided therein and side walls having multiple weep holes and joints for connection, which can be spread to a desired size by connecting these unit boxes.

The structured body for drainage treatment can be used as a material for drainage of sports grounds, roads, parks, golf links, stockhouses, riding grounds and the like, as an antifreezing material for roads in cold districts, and as a material for preparing tree-planting ground in the concrete portion on the roof, desert areas and the like.

Furthermore, the present invention includes and impounding and flushing system to prevent muddy earth (sludge) from sedimenting in the concrete face of the like on the building roof which s the face that the structured body for drainage treatment described above is to be placed.

1 Claim, 8 Drawing Sheets

PARTICULARLY, A STRUCTURED BODY FOR THE DRAINAGE TREATMENT FOR THE PREPARATION FOR TREE-PLANTING GROUND, AND ITS IMPOUNDING AND FLUSHING SYSTEM

This is a divisional of application Ser. No. 07/997,350 filed on Dec. 28, 1992 and now U.S. Pat. No. 5,373,661.

BACKGROUND OF THE INVENTION

The present invention relates to a structured body for the drainage treatment, and its impounding and flushing system, which will become the materials for drainage treatment when preparing a garden, for example, on the concrete floor on the roof of the building.

Furthermore, the structured body for the drainage treatment and its impounding and flushing system of the present invention can be applied to sports grounds, roads, parks, golf links, stockhouses and riding grounds.

The difference between the present invention and the conventional techniques described below, the usage and the examples of the present invention, the action and the effects will be described in detail by limiting the application to the preparation for tree-planting areas.

Conventionally, tree-planting areas have been prepared by planting plants on concrete faces of the roof in order to effectively use the roof of the building.

In such cases, materials for drainage treatment, such as gravels for drainage and crushed stones for drainage, are spread in the designated area of the concrete face on the roof to level the area, earth is spread on the upper surface of said materials for drainage treatment, to which plants such as lawns and trees are planted to form a tree-planting area, resulting in tree-planting on the roof of the building.

Therefore, in order to plant trees on the roof of the building, not only the materials for drainage treatment such as gravels for drainage and crushed stones for drainage are needed, but it takes time to spread the materials for drainage treatment. When this tree-planting area is leveled, it is also necessary to dig up the gravels for drainage and crushed stones for drainage by spades and shovels, which requires extra labors and time, and results in expensive leveling cost.

Therefore, the present inventors have developed the structured body for drainage treatment for gardening which comprises as a minimum unit a combined body of an unit box composed of side walls having multiple weep holes and joints for connection, and a lattice panel wall having multiple weep holes which is put into the interior of the unit box.

The feature of said technique is to dispose the structured body for drainage treatment having the above-mentioned structure to be jointly spread in the designated area of the concrete face on the roof of the building, to spread sponge sheets or permeable nets on the upper face of the top wall portion of the structured body for drainage treatment, to sread earth on the upper face of the sponge sheets or the permeable nets, and to plant lawns and trees to prepare the tree-planting area on the roof of the building. The rainwater which fails to the tree-planting area on the roof of the building will go through the spread earth, sponge sheets or permeable nets, multiple weep holes in the top wall portion of the structured body for drainage treatment, multiple weep holes in the lattice panel wall which is put into the interior of the structured body for drainage treatment, and multiple weep holes in the side wall on the structured body for drainage treatment, to the gutter of the concrete face on the roof to be drained. It is contrived to permeate the rainwater collected in the interior of the structured body for drainage treatment to the sponge sheets or the like which is spread on the upper face of the top wall portion of the structured body for drainage treatment by the capillary action to stimulate the earth to keep the water, which results in that the earth to which lawns and trees are planted keeps wettability, which makes it possible for plants to grow normally even in the concrete face on the roof of the building where plants cannot grow naturally.

Since the weight and the pressure of the earth and plants are directly added to the structured body for drainage treatment when the tree-planting area is prepared on the concrete face on the roof as described above by using the structured body for drainage treatment having the above-mentioned structure, it is necessary to keep the structured body for drainage treatment earth-pressure-resistant and strength-resistant. As the means to solve it, the present inventors have proposes the lattice panel wall as the reinforcing material.

In the structured body for drainage treatment described above, however, it is necessary to produce lattice panel walls separately from the unit box formed by side walls having multiple weep holes and joints for connection and to put said lattice panel walls into the interior of the unit box, which requires extra time and labors. If said lattice panel walls are not used, the strength of the structured body for drainage treatment cannot be maintained. Furthermore, putting lattice panel walls into the interior of the box makes drainage (drainability) poor, and extra cost for the lattice panel walls should be borne, which is not economical.

Therefore, it is at least appreciable that the structured body for drainage treatment described above is effective as a material for drainage treatment to accelerate the drainage instead of gravel draining layer on the tree-planting ground which is prepared on the roof of the building.

In the above-mentioned application example, however, while the effect of draining rainwater can be expected by spreading the structured body for drainage treatment, it is undeniable that when it rains, the particles of earth spread on the top wall portion of the structured body for drainage treatment become muddy and flow into the interior of the structured body for drainage treatment through multiple weep holes on the top wall portion, and the muddy liquid adheres to the concrete face on the roof of the building which is the face to be disposed of the structured body for drainage treatment and is piled up and solidified, becoming muddy earth if being left as it is for a ling time, whereby the drainability of the tree-planting ground on the roof will be hindered.

Furthermore, various components contained in the earth particles are piled up on the concrete face, and dissolve the concrete component with the lapse of time, which may cause the leakage of water in the building.

Therefore, the primary object of the present invention is to modify essentially the structured body for drainage treatment described above.

Another object of the present invention is to solve the problem that the muddy earth (sludge) and the like are piled up on the concrete face on the roof of the building and damage the face of the concrete floor to decrease the effect of drainage.

SUMMARY OF THE INVENTION

The present invention provides a structured body for drainage treatment for preparing a tree-planting ground, which is made of plastic and is composed of a top panel having plural weep holes as well as plural downward cylinders provided in the panel face, and downward concave portion in the corners of the panel face, a frame having plural weep holes provided in the side wall framed in every side, notch weep holes provided in the lower edge of said side wall, in which a concave portion for connection and convex portion for connection are formed in the side wall, and a bottom panel having an upward cylinder provided in the corners of the panel face.

Furthermore, the present invention provides a structured body for drainage treatment for preparing a tree-planting ground comprising frames which form triangular reinforcing materials in the inner portion of the corner.

Furthermore, the present invention provides a structured body for drainage treatment for preparing a tree-planting ground, which is made of plastic and composed of a top panel having plural weep holes as well as plural downward cylinders provided in the panel face, a frame having plural weep holes provided in the side wall framed in every side and notch weep holes provided in the lower edge of said side wall, in which a concave portion for connection and convex portion for connection are formed in the side wall, and a bottom panel having multiple concaves provided in the panel face.

Furthermore, the present invention provides the structured body for drainage treatment, which is made of plastic, and composed of a top panel having plural weep holes and plural downward cylindrical struts which can withstand the pressure in the vertical direction from the vegetation earth layer, a frame which constitutes weep holes which lead to weep holes provided in the side wall of the adjoining structured body for drainage treatment and semicircular concave portion which matches to the semicircular concave portion formed in the central portion of the side edge of the adjoining structured body for drainage treatment, and also having connecting concave portion which is relatively conjugated with the connecting convex portion provided in the external corner of the adjoining structured body for drainage treatment and connecting convex portion which is relatively conjugated with the connecting concave portion provided in the external corner of the adjoining structured body, and a bottom panel having an upward cylinder provided in its upper face. The material for molding the structured body for drainage treatment described above is waste plastic.

Furthermore, the present invention includes impounding and flushing means accompanying the tree-planting ground on the roof prepared in the designated area of the concrete face on the roof of the building, and said impounding and flushing means are composed of the first water tank set in the weep holes on the roof of the building, a septic tank for drainage connected to the first water tank, the second water tank connected to the septic tank for drainage, a pressure drainage layer connected to the second water tank, a liquid fertilizer tank connected to the pressure drainage layer and a flushing aqueduct connected to the liquid fertilizer tank.

The characteristic feature of said first water tank described above is that a central cylindrical portion connected to the weep holes of the building is established, to which a filter is dismountably mounted.

The above-mentioned flushing aqueduct is plumbed so that it surrounds the outer periphery of the tree-planting ground on the roof in the state that it creeps into the flushing aqueduct-holding concave portion of the piping-supporting wall unit connected to and formed by the wall units each other affixed to the concrete protective walls on the roof of the building which is located in the higher position than the gradient of the concrete face which becomes the prepared face of the tree-planting ground on the roof. And said flushing aqueduct has plural pressurized water injection nozzles pointing to the outer periphery of the structured body for drainage treatment of the tree-planting ground on the roof.

Furthermore, it is the characteristic feature of the present invention that the unit of the above-mentioned piping-supporting wall material has a flushing aqueduct-holding concave portion in the front part of the wall unit and a connecting convex portion at one side of the wall unit.

DESCRIPTION OF THE PREFERRED EMBODIMENTS

Examples of the present invention will now be described in detail with reference to the drawings.

Figure 1:
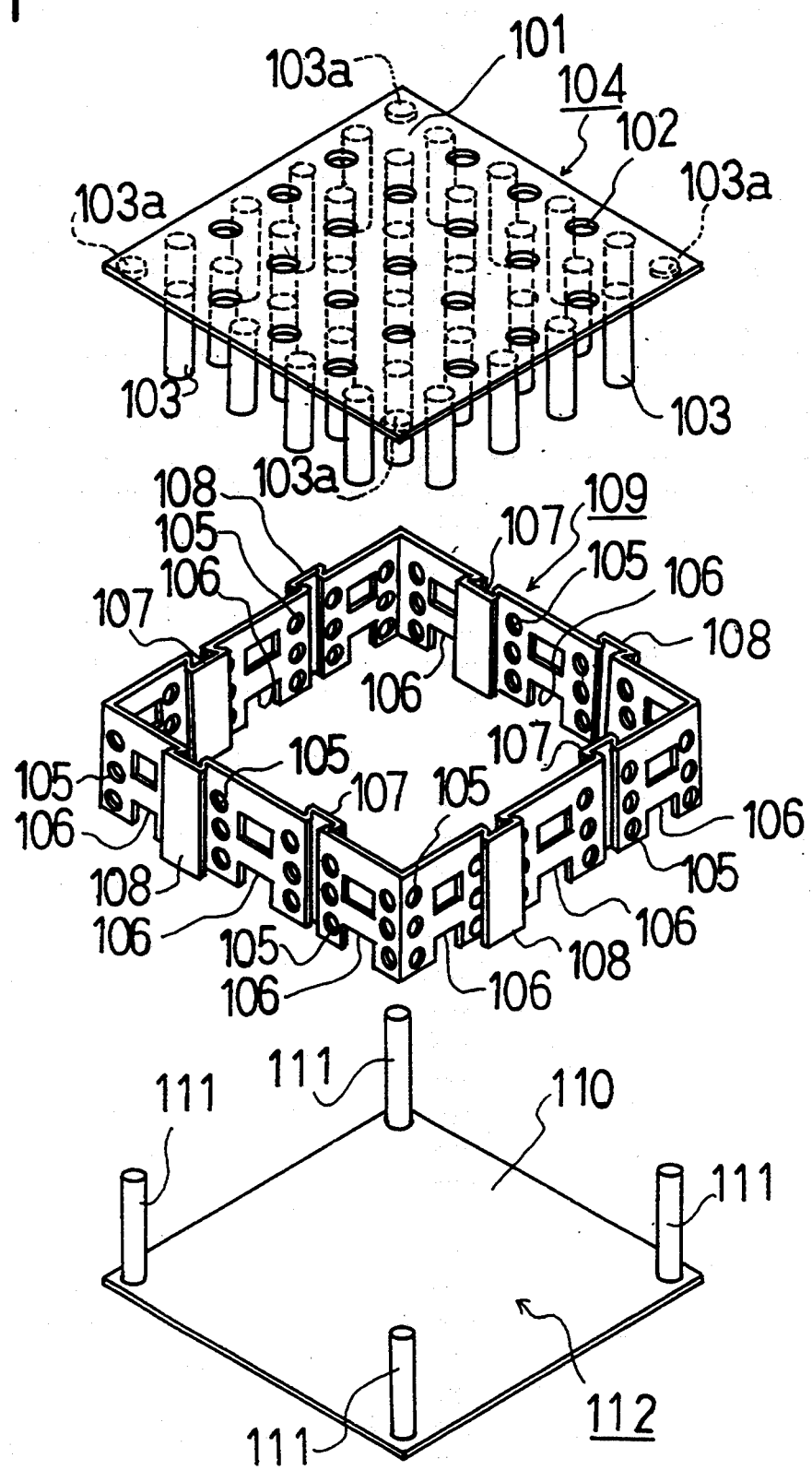
FIG. 1 is a disassembled perspective view of the structured body for drainage treatment of the present invention.
Figure 2:
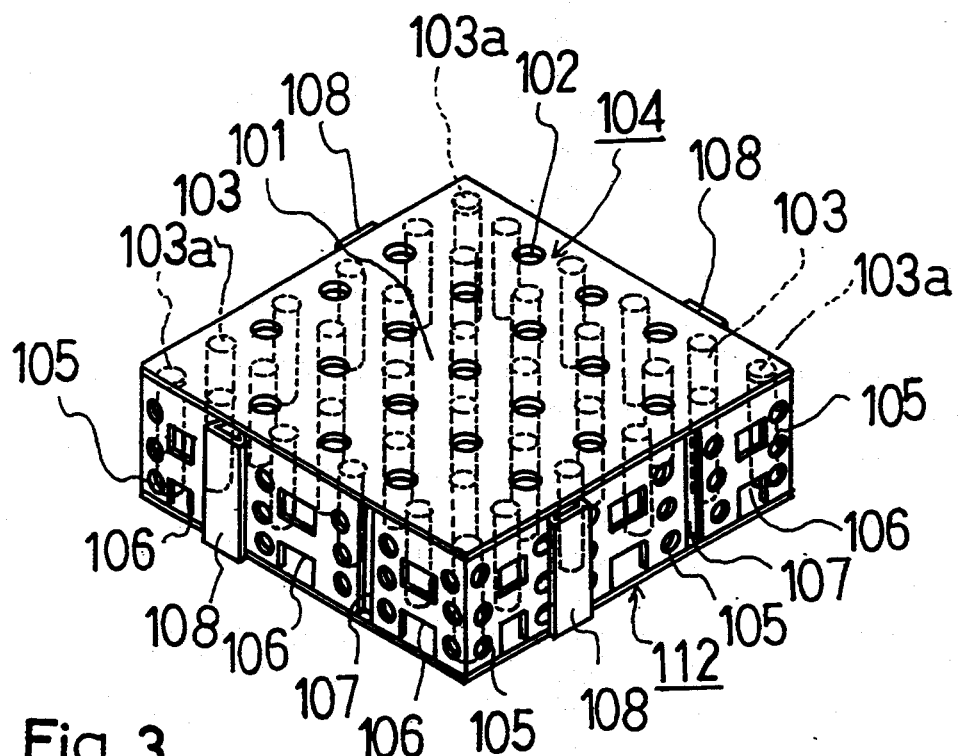
FIG. 2 is an entire perspective view relating to FIG. 1.

FIGS. 1 to 2 illustrate the structure of the structured body for drainage treatment according to the present invention, wherein said structured body is produced by plastic molding and is composed of a top panel 104 having multiple weep holes 102 provided in the panel face 101, multiple downward cylinder 103 provided in the panel face 101, and downward concave portion 103 provided in the corners of the panel face 101, a frame 109 having multiple weep holes 105, notch weep holes 106 and connecting concave portion 107 and connecting convex portion 108, and a bottom panel having an upward cylinder 111 provided in the corners of the panel face 110.

Figure 3:
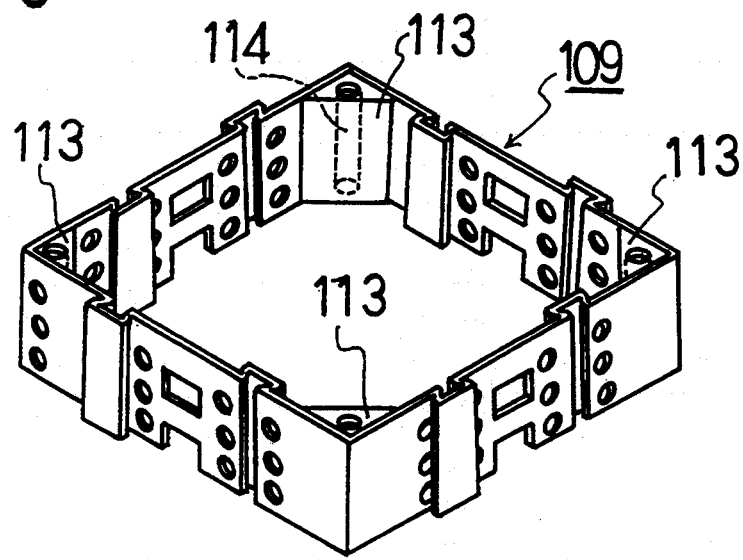
FIG. 3 is a perspective view illustrating other frame structures of the structured body for drainage treatment of the present invention.

Incidentally, as shown in FIG. 3, a triangular reinforcing material 113 may be provided in the internal corner of the frame 109, and a perforative vertical hole 114 may be provided in said triangular reinforcing material 113.

Figure 4:
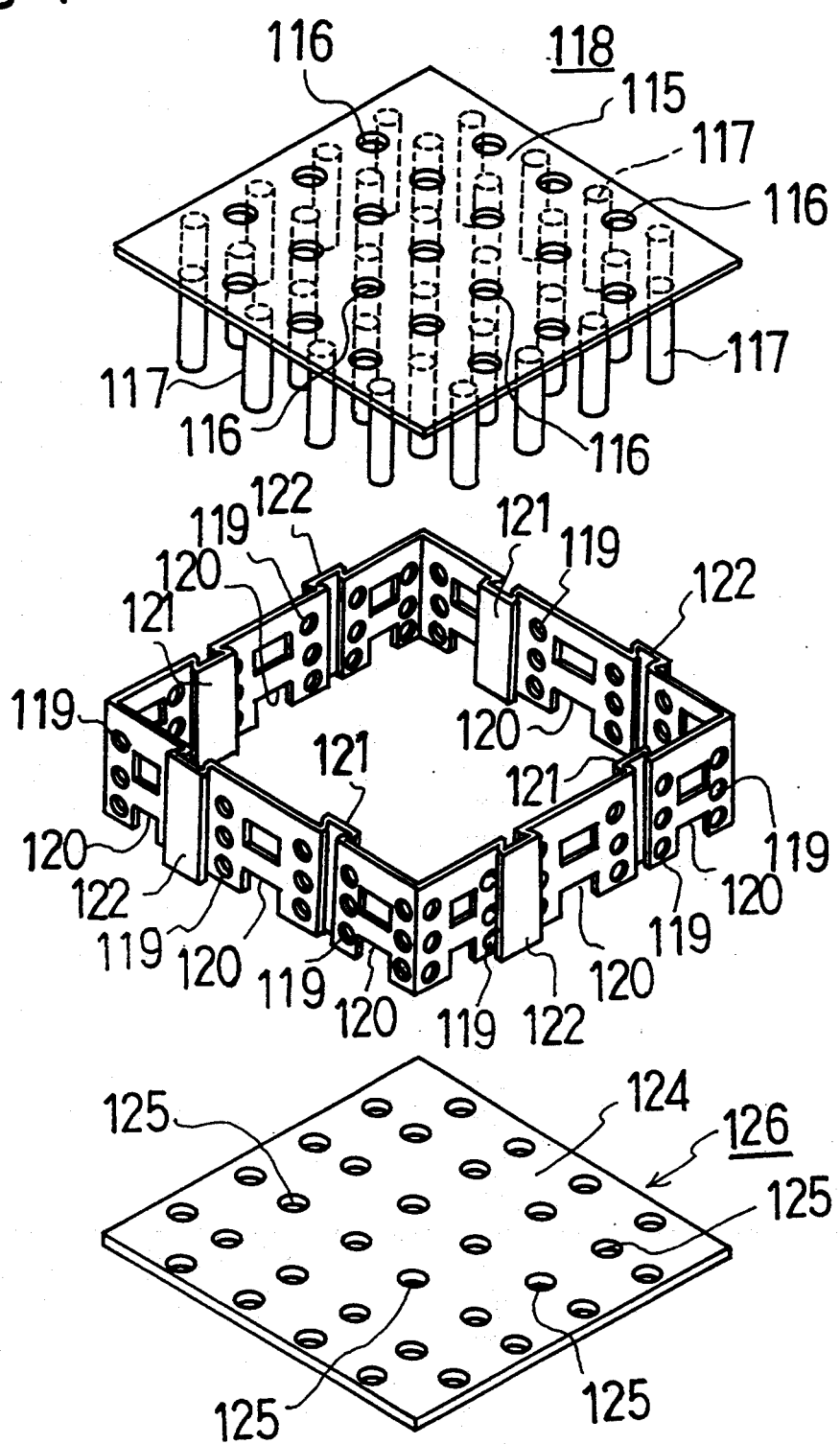
FIG. 4 is a disassembled perspective view of the other structured body for drainage treatment of the present invention.
Figure 5:
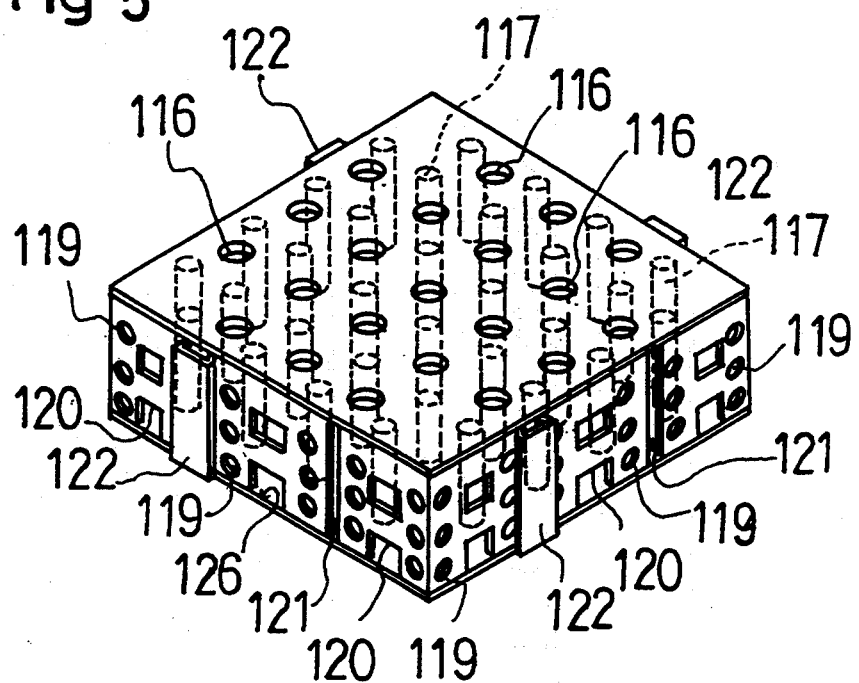
FIG. 5 is an entire perspective view of the structured body for drainage treatment relating to FIG. 4.

FIGS. 4 and 5 disclose another example of the structured body for drainage treatment according to the present invention, where said structured body for drainage treatment is produced by plastic molding and is composed of a top panel 118 having plural weep holes 116 provided in the panel face 115 and a frame 123 having plural weep holes 119, notch weep holes 120, and connecting concave portion 121 and connecting convex portion 122, and a bottom panel 126 having plural concave portions 125 in the panel face 124.

In the structure of each example shown in FIGS. 1 and 2, and FIGS. 4 and 5 described above, it becomes possible to connect the structured bodies for drainage treatment of the present invention in the vertical and horizontal directions by relative conjugation of the connecting convex portion 108 and 122 provided in the frame 109 and 123, respectively, of the structured body for drainage treatment with the connecting concave portion provided in the frame (not shown) of the structured body for drainage treatment having a separate similar structure, and relative conjugation of the connecting concave-portion 107 and 121 provided in the frame 109 and 123, respectively, of the structured body for drainage treatment with the connecting convex portion provided in the frame (not shown) of the structured body for drainage treatment having a separate similar structure.

Figure 6:
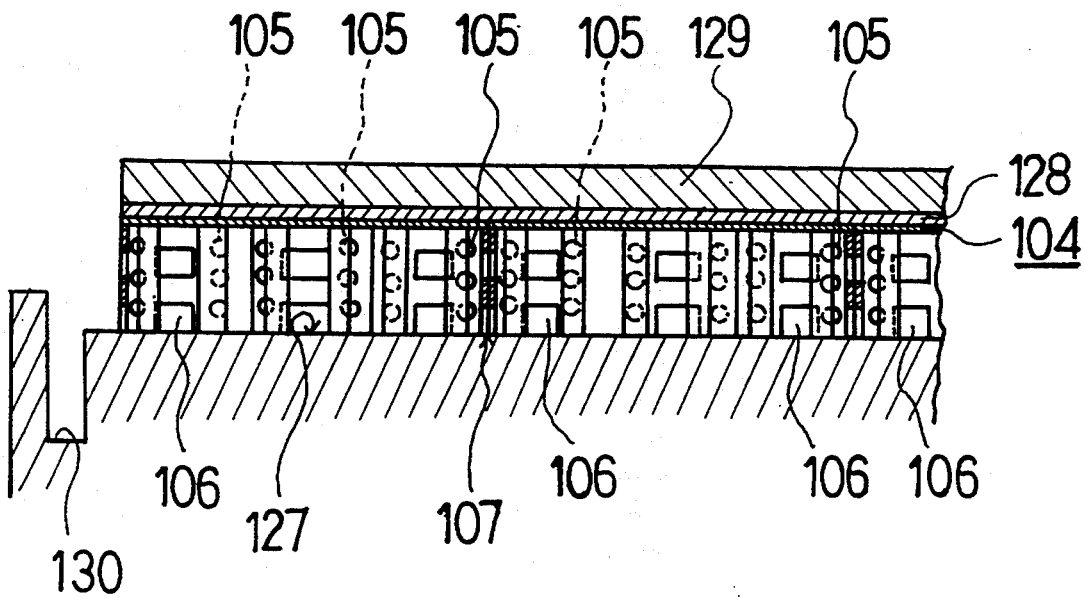
FIG. 6 is a sectional view illustrating the state in which the structured body for drainage treatment relating to the example in FIG. 1 is disposed in the concrete face on the roof of the building to form the tree-planting area.

FIG. 6 discloses the state of use of the structured body for drainage treatment described above and illustrates the state in which it is used as a material for drainage treatment in preparing a tree-planting area on the concrete face on the roof of the building.

The structured body for drainage treatment of the present invention is molded by using waste plastic.

In the drawing, reference numeral 127 represents concrete face on the roof of the building, reference numeral 128 represents sponge sheets or permeable nets spread on the upper face of the top panel 104 of the structured body for drainage treatment of the present invention, reference numeral 129 represents earth spread on the upper face of the sponge sheets or permeable nets, and reference numeral 130 represents gutter for drainage provided in the concrete face 127 on the roof.

As the above-mentioned earth 129, it is preferred that the bamboo powder disclosed in Japanese Patent Application No. 4-207055 of which application was filed by the present inventors be used.

Said bamboo powder is noted in that it is excellent in water-absorbing property, tackiness and corrosion resistance and that dwarfism of vegetation is proved.

Accordingly, when said bamboo powder is used to grow plants in the tree-planting ground on the roof described below, it prevents plants from growing too big and secures the safety of the building.

The action of the present invention will now be described with reference to FIG. 6.

First, the structured bodies for drainage treatment of the present invention are connected to the desired size by the above-mentioned connecting method, and the open side of the structured body for drainage treatment is disposed confronting the concrete face 127 on the roof.

In this case, since the concrete face is hard, the bottom panel 112 may not be used.

Then, a sponge sheet or permeable net 128 is spread on the upper face of the top panel 104 of the structured body for drainage treatment which is spread and connected to the concrete face 127 on the roof of the building, earth 129 is spread on the upper face of the sponge sheet or permeable net 128, and plants (not shown), such as lawns and trees are planted in the earth 129, whereby a tree-planting area is prepared in the designated area of the concrete face 127 on the roof of the building.

The rainwater which falls on such tree-planting area goes and is drained through the earth 129, sponge sheet or permeable net 128, plural weep holes 102 provided in the top panel 104 of the structured body for drainage treatment of the present invention, plural weep holes 105 provided in the frame 109 of the structured body for drainage treatment of the present invention, and notch weep holes 106 to the gutter 130 provided in the concrete face 127.

As disclosed in FIG. 3, in the case where a triangular reinforcing material 113 is provided in the internal corner of the frame 109, since the drainage flows along the two slopes of the triangular reinforcing material 113, the drainability can be improved and the threat that muddy earth and the like are piled up in the internal corner of the frame is diminished, while the shape of the frame can be retained.

Furthermore, if the gutter 130 on the concrete face 127 on the roof is closed by an appropriate means, rainwater is stored in the internal portion of the structured body for drainage treatment of which bottom is the concrete face 127 on the roof, and the rainwater is permeated into the sponge sheet or permeable net 128 spread on the upper face of the top panel 104 described above by the capillary phenomenon to accelerate the maintainability of water in the earth 129 on the upper face of the sponge sheet or permeable net 128, resulting in keeping the weltability in the earth 129 where lawns and other plants are planted.

In the case where the structured body for drainage treatment of the preset invention is connected and spread to the soft ground, however, it is necessary to spread the bottom panel 112.

In this case, upward cylinder 111 provided in the corner portion in the bottom panel 112 disclosed in FIG. 1 and downward concave portion 103 provided in the corner portion of the top panel 104 are connected to each other, or plural downward cylinders 117 of the top panel 118 are fitted into the inner portion of the concaves 125 provided in the bottom panel 126 disclosed in FIG. 4, whereby the structured body for drainage treatment can be connected and spread to the soft ground and the like to prepare the tree-planting area even in the soft ground and the like.

Figure 7:
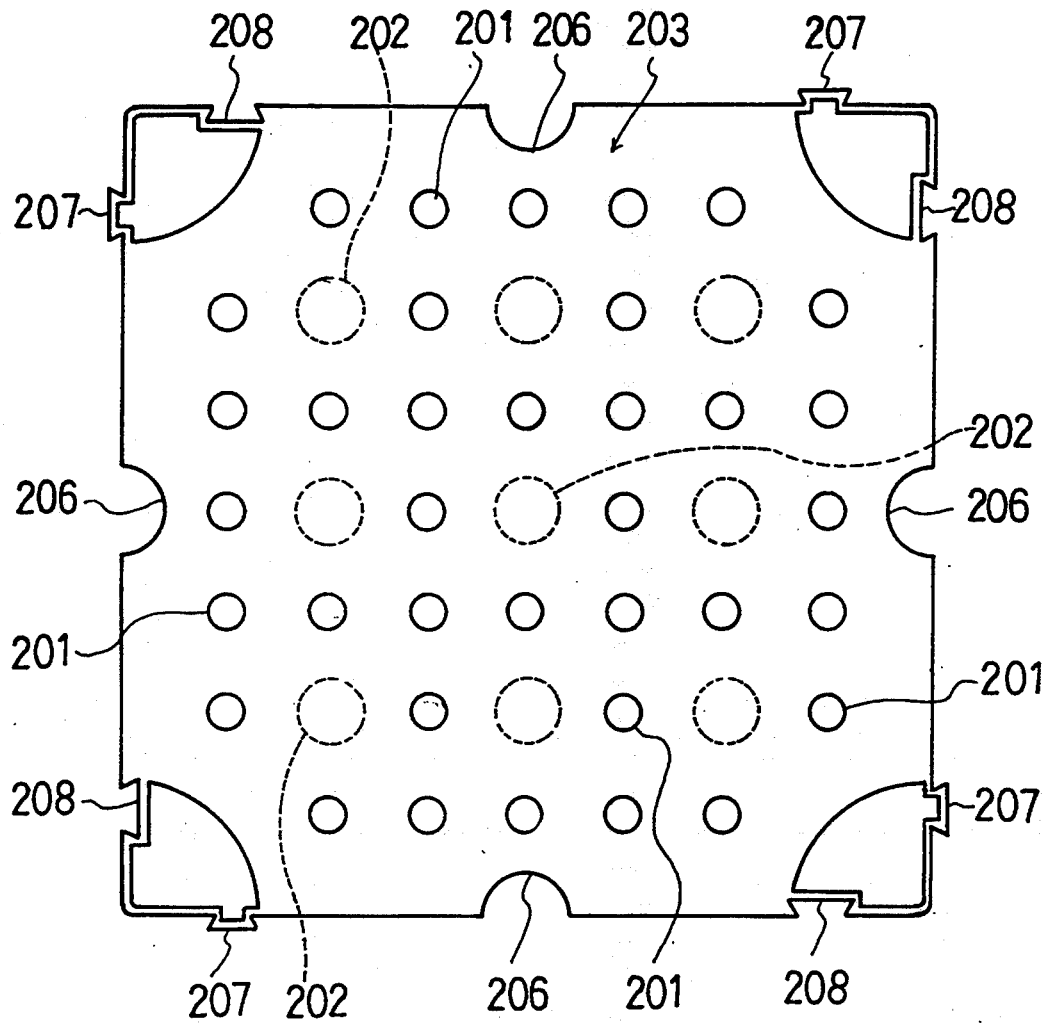
FIG. 7 is a plane view of the other structured body for drainage treatment of the present invention.

Next, another example of the present invention will be described in detail with reference to FIGS. 7 and 13.

Figure 8:
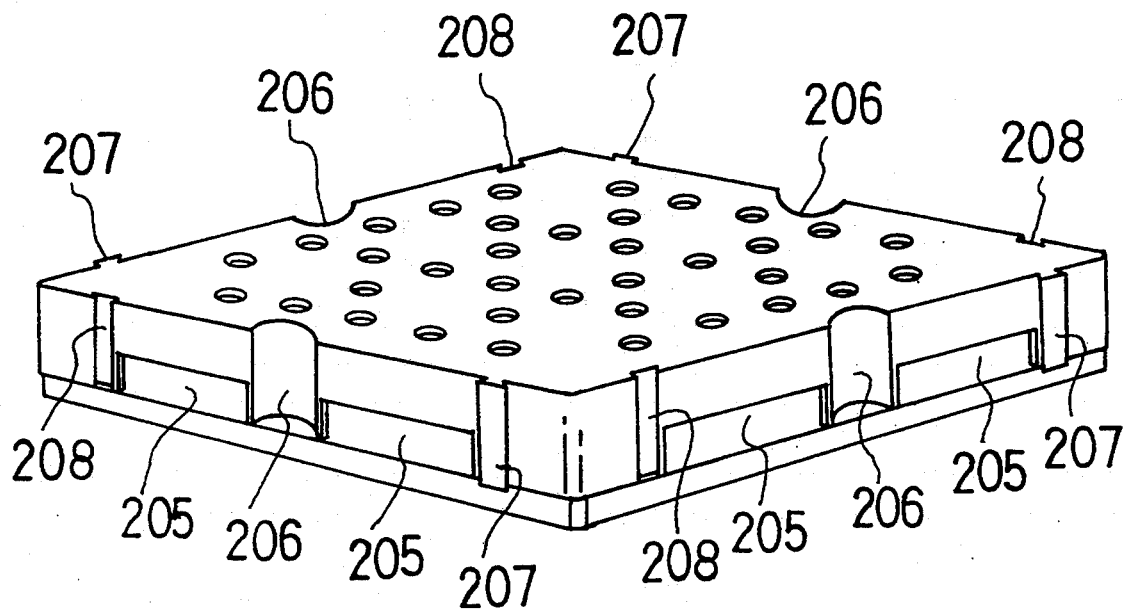
FIG. 8 is an entire perspective view of the structured body for drainage treatment relating to the example in FIG. 7.
Figure 9:
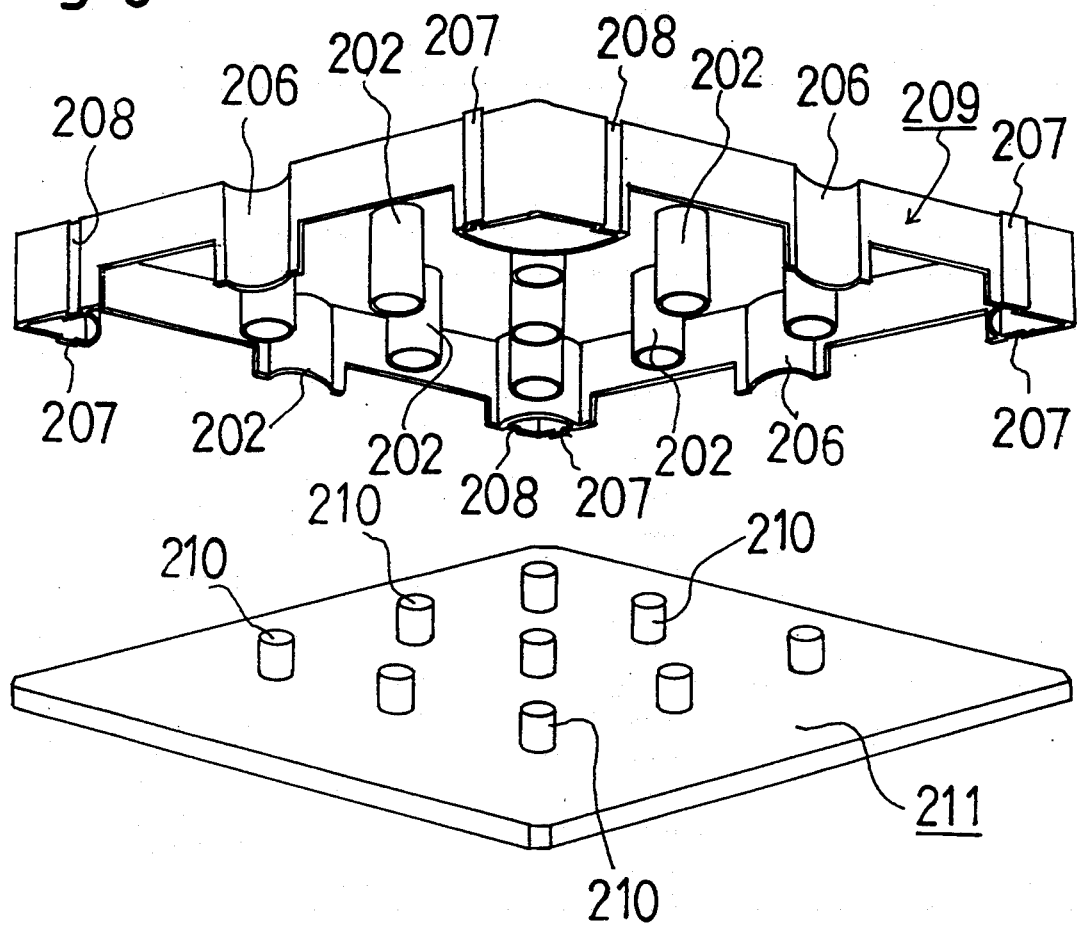
FIG. 9 is a disassembled perspective view of the structured body for drainage treatment relating to the example in FIG. 7.

In FIGS. 8 and 9 is disclosed another structured body for drainage treatment of the present invention.

This structured body for drainage treatment is, as in the case of the structured body for drainage treatment in the above-mentioned example, molded by plastic molding into the box of the whole sectional shape of and composed of the top panel 203 having plural weep holes 201 and plural downward cylinders 202 provided therein, a frame 209 having notch weep holes 205 and semi-circular concaves 206, and at the external corner portion, having also connecting convex portion 207 and connecting concave portion 208 for reciprocally connecting the structured body for drainage treatment when being spread, and a bottom panel 211 having cylindrical projections 210 in the upper face.

Figure 13:
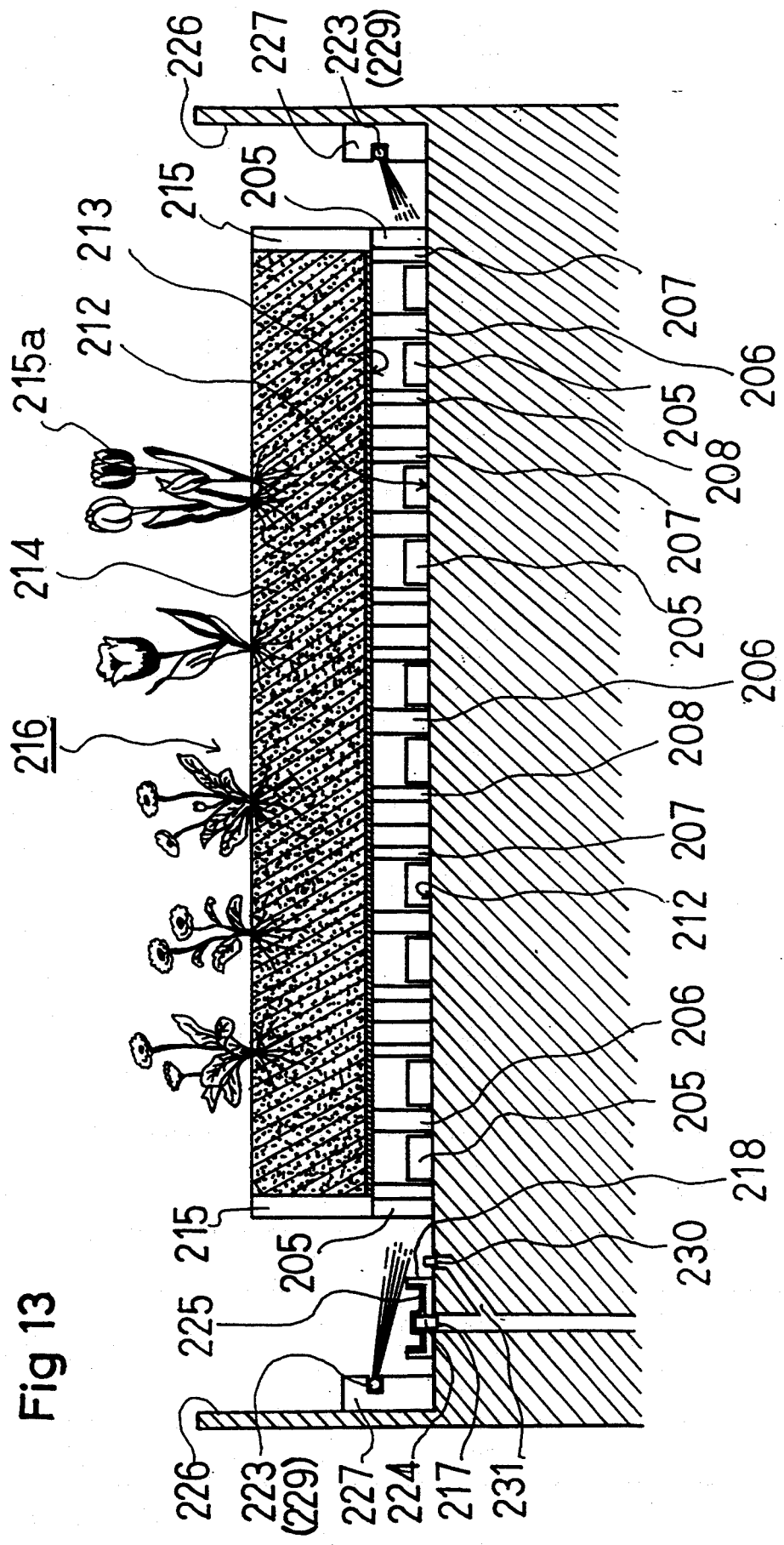
FIG. 13 is a sectional view illustrating the state in which the structured body for drainage treatment relating to the example in FIG. 7 is disposed in the concrete face on the roof of the building to form a tree-planting area.

Said structured body for drainage treatment is spread in the state that the open side is spread in articulated disposition in the designated area of the concrete face 212 on the roof, as shown in FIG. 13.

And permeable nets 213 are spread to the top panel 203 of the structured body for drainage treatment, and on the upper face of this permeable nets 213 is constituted a vegetation earth layer 214.

The outer periphery of this vegetation earth layer 214 is surrounded by a wall for preventing effusion of the earth 215 to stop the earth, and plants 215 are planted in the vegetation earth layer 214 to form a roof tree-planting ground 216.

Incidentally, when this structured body for drainage treatment is spread to the soft ground and the like, a bottom plate 211 is used.

Figure 10:
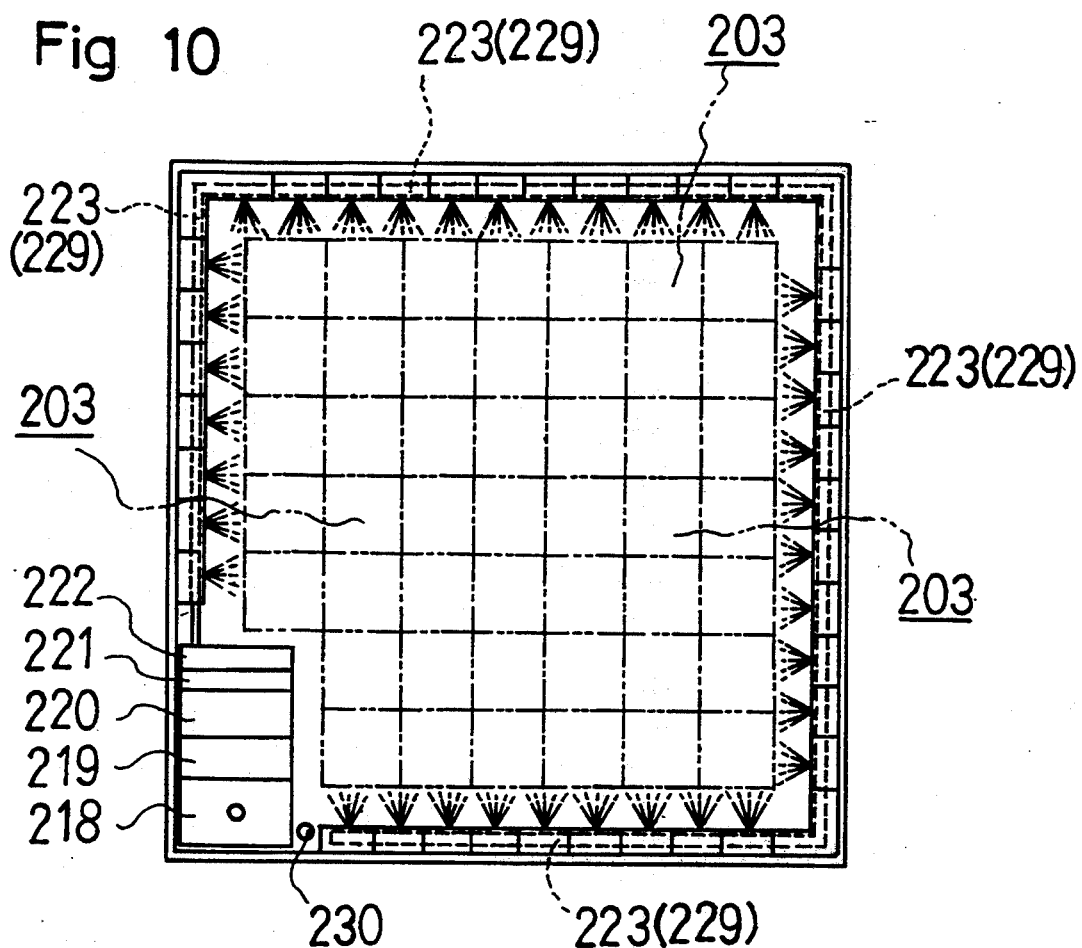
FIG. 10 is a systematic diagram of the installation of the impounding and flushing system relating to the example in FIG. 7.
Figure 11:
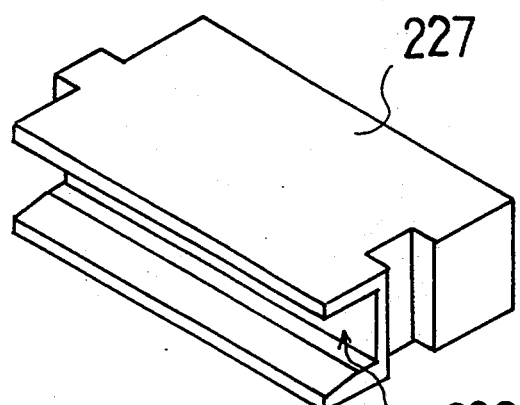
FIG. 11 is a perspective view of the piping-supporting wall material relating to the example in FIG. 7.
Figure 12:
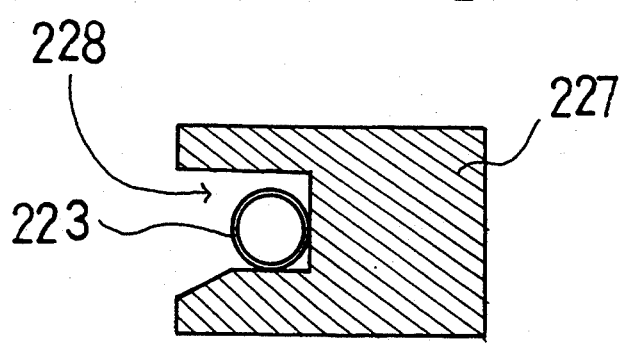
FIG. 12 is a sectional side view of the piping-supporting wall material of FIG. 11.

FIG. 10 illustrates and impounding and flushing system which is important in constituting the present invention. This system is composed of the first water tank 218 set in the weep hole portion 217 on the roof of the building, a septic tank for drainage 219 connected to the first water tank 218, the second water tank 220 connected to the septic tank for drainage 219, a pressure drainage layer 221 connected to the second water tank 220, a liquid fertilizer tank 222 connected to the pressure drainage layer 221 and a flushing aqueduct 223 connected to the liquid fertilizer tank 222.

The first water tank 218 described above has a central cylindrical portion 224 connected to the weep hole portion 217 of the building roof and has a filter 225 dismountably mounted to the contral cylindrical portion 224, whereby muddy water which flows into the first water tank is separated to the water and the earth, and the water which overflows the first water tank 218 is drained to the outside of the building through the contral cylindrical portion 224 connected to the weep hole portion 217 of the building roof.

The septic tank for drainage 219 described above supplies and purifies the drainage which is automatically carried from the first water tank 218.

The second water tank 220 described above stores the purified water which is automatically carried from the septic tank for drainage 219 or city water.

The pressure drainage tank 221 described above pressurizes the purified water which is automatically carried from the second water tank 220 or city water.

The liquid fertilizer tank 222 described above supplies liquid fertilizer to the plants on the roof tree-planting ground 216.

And, the flushing aqueduct 223 connected to the liquid fertilizer tank 222 is plumbed so that it surrounds the outer periphery of the roof tree-planting ground 216 in the state that it creeps into the flushing aqueduct-holding concave portion 228 of the piping-supporting wall material 227 made of plastic or concrete affixed to the concrete protective wall 226 on the building roof which is located in the higher position than the gradient of the concrete face 212 which becomes the prepared face of the roof tree-planting ground 216 described above. And this flushing aqueduct 223 has plural pressurized water injection nozzles 229 pointing to the outer periphery of the structured body for drainage treatment of the roof tree-planting ground 216.

The reference numeral 230 in FIG. 13 represents other weep holes provided in the concrete face in the proximate position of the first water tank 218 described above, and reference numeral 231 represents a bypass tube which connects said weep holes 230 with weep holes 217 connected to the central cylindrical portion 224 of the first water tank.

Since another example of the present invention disclosed in FIGS. 8 through 13 is constituted as described above, it can prevent the muddy earth or the like from being sedimented in the concrete face in the manner as described below.

Namely, in the case that the roof tree-planting ground 216 is prepared in the designated area of the concrete face 212 on the building roof, first, the open side of the structured bodies for drainage treatment in desired numbers is spread toward the concrete face 212, while connecting the connecting convex portion and connecting concave portion adjacent to each other, the permeable nets 213 are spread on the top panel 203 of the structured bodies for drainage treatment which are connected and spread, vegetation earth layer 214 is constituted on the upper face of the permeable nets 213, and plants 215 are planted in this vegetation earth layer 214.

Then, the rainwater permeated in this vegetation earth layer 214 flows through the peameable nets 213 and plural weep holes 201 provided in the top panel 203 of the structured body for drainage-treatment to the internal portion of the structured body for drainage treatment, becoming muddy liquid, and flows out through the notch weep holes 205 connected to the frame 209 of the structured body for drainage treatment to the concrete face surrounding the roof tree-planting ground 216, and the muddy water, as well as the surface water stored in the same concrete face, naturally flows into the first water tank 218 set corresponding to the position of the weep hole portion 217 of the building and collected.

Then, the muddy water collected in the first water tank is separated to water and mud (sludge) by the filtration of the filter 225 in the first water tank 218, and the mud (sludge) collected by the filter 225 can be disposed by removing the filter 225.

The water which overflows the first water tank 218 is drained through the central cylindrical portion 224 of the tank and the weep hole portion 217 connected thereto into the inside of the building.

When it rains heavily and the water level on the concrete face 212 becomes higher than the level of the first water tank, other weep holes 230 are opened to drain water off to the outside of the building through the bypass 231.

When water is stored in the first water tank 218, the weep holes 230 described above and weep holes 217 connected to the central cylindrical portion 224 of the first water tank 218 are closed to store water therein.

When it is feared that the muddy water or the like is sedimented and indured in the concrete face 212 which becomes the face that the structured body for drainage treatment described above is to be placed, the rainwater stored in the first water tank 218 is automatically carried to the septic tank for drainage 219 to be purified, and the rainwater purified in the septic tank for drainage 219 is automatically carried to the second water tank 220. The purified water (or city water) stored in the second water tank 220 is automatically carried to the next pressure drainage tank 221, and the desired hydraulic pressure can be secured by the compression pump of this pressure drainage tank 221.

Furthermore, if necessary, liquid fertilizer may be automatically supplied from the liquid fertilizer tank 222 connected to said pressure drainage tank 221 into the pressure drainage tank 221, and the mixed liquid of the purified water (or city water) in the pressure drainage tank 221 and the liquid fertilizer may be discharged as described below.

The pressurized water thus pressurized in the pressure drainage tank 221 is supplied to the flushing aqueduct 223 plumbed so that it creeps into the flushing aqueduct-holding concave portion of the piping-supporting wall material 227 affixed to the concrete protective wall 226 on the building roof which is located in the higher position than the gradient of the concrete face 212 where the roof tree-planting ground 216 is prepared and it surrounds the outer periphery of the roof tree-planting ground 216, while the plural pressurized water injection nozzles 229 which are placed to point the outer periphery of the structured body for drainage treatment in the roof tree-planting ground 216 are operated, and the pressurized water which is forcibly injected from the pressurized water injection nozzle 229 is discharged into the inside of the structured body for drainage treatment from the notch weep holes 205 which is provided in the frame 209 of the structured body for drainage treatment opposite to the pressurized water injection nozzle 229.

Accordingly, the injection power of the above-mentioned pressurized water enables to flush the concrete face 212.

Incidentally, even in the case that the structured body for drainage treatment is prepared in the roof tree-planting ground 216 by spreading in the concrete face 212 on the building roof a combined body of the bottom panel 211 and the frame 209 which is prepared by inserting the cylindrical projection 210 of the above-mentioned bottom panel 211 into the downward cylinder 202 of the top panel 203, it can be prevented that muddy earth (sludge) or the like is sedimented on the upper face of the bottom panel 211, as in the example described above.

As mentioned above, the structured body for drainage treatment according to the present invention has a simpler structure compared to the structured body for drainage treatment having a conventional structure in which the earth pressure is sustained by providing a lattice panel wall in the box formed by an top panel, side walls and a bottom panel, and has an advantage in that the resistance against earth pressure and the strength resistance can be maintained.

Namely, in the example disclosed in FIGS. 1 and 2, the concaves provided in the lower face of the corner portion of the top panel and the upward strut provided in the corner portion of the bottom panel maintain the matching condition, and at the disposition, the plural downward cylinders provided in the top panel abut against the face that the structured body is to be placed, such as the above-mentioned concrete face and the like, resulting in that it can endure the pressure from the upper direction.

Furthermore, as disclosed in FIG. 3, since the triangular reinforcing material is provided in the corner portion of the frame, the frame per se can keep the shape.

Furthermore, as disclosed in FIG. 4; plural downward cylinders provided in the top panel and plural concaves provided in the bottom panel maintain the matching condition, and at the disposition, the plural downward cylinders provided in the top panel about against the face that the structured body is to be placed, such as the above-mentioned concrete face and the like, resulting in that it can endure the pressure from the upper direction. Furthermore, as disclosed in FIG. 8, fitting of the cylindrical projection provided in the top panel and the upward cylindrical strut provided in the bottom panel enables to endure the pressure from the upper direction.

Furthermore, since it is not necessary to use the conventional lattice panel wall, the drainability and maintainability of water can be improved, and when preparing the tree-planting area or disposing the drainage of grounds, riding grounds or roads, since any materials for drainage, such as gravels or crushed stones are not required, it takes little labors to construct the structured body at the application site, whereby the structured body for drainage treatment of the present invention can be provided economically and at a low price.

The use of the structured body for drainage treatment according to the present invention is very wide, for example, it can be used as a material for drainage treatment when preparing the above-mentioned tree-planting ground, as well as a material for drainage treatment of grounds, roads, parks, golf links, stockhouses and riding grounds, as a material for preparing tree-planting ground in desert areas or the face of slope, and as an antifreezing material for roads in cold districts.

For example, in the case of riding grounds, if the structured body for drainage treatment of the present invention is connected and spread on the basic roadbed of the riding ground and road surface materials are spread on the structured body, the drainage treatment can be effectively carried out.

Furthermore, when it is used as a material for roads in cold districts, it can prevent roads from freezing in cold districts, for it shuts off water form rising from the ground.

Moreover, it becomes possible to connect and spread the structured body, whether the ground is hard or soft.

When the impounding and flushing system disclosed in FIG. 10 is supplemented to the tree-planting ground on the roof prepared by using the structured body for drainage treatment of the present invention, the concrete face which becomes the face that the roof tree-planting ground is to be prepared can be easily flushed.

That is, it can be prevented that muddy earth and the like are sedimented, by flowage of the earth particles for a long period, to the concrete face to damage the concrete face and the effect of drainage is decreased, and as a result, the effect of drainage of the tree-planting ground on the roof can be improved.

Furthermore, it becomes possible to store, collect, and reuse rainwater, to separate rainwater from mud earth, and to purify rainwater, therefore, the impounding and flushing system is the most suitable for flushing the concrete face which becomes the face that the structured body for drainage treatment is to be placed, and for flushing, maintenance and and management of the bottom panel of the structured body for drainage treatment.

Therefore, according to the structured body for drainage treatment and the impounding and flushing system of the present invention, very favorable effect can be brought to the growth of plants, while excellent drainability can be maintained.

Furthermore, waste plastic is used when the structured body for drainage treatment of the present invention is molded, which accelerates the reuse of petroleum products and saving of oil resources, and prevents pollution problems from causing by incinerating waste plastic, whereby the effect to economize the resources and thermal energy can be expected.

Furthermore, if limiting to the tree-planting on the building roof, the conventional method uses gravels, crushed stones, or the like for draining materials. Accordingly, problems such as weight and costs, difficult drainage problems such as weight and costs, difficult drainage and blockage of water have been caused.

Moreover, the inorganic substances exuded from the earth dissolve the concrete on the roof as described above, and leaking of rain through the roof is worried.

Also, gravels and crushed stones are valuable natural resources, and mining of gravels, crushed stones, and earth and sand leads to destruction of nature.

In the case of the present invention, however, the structured body for drainage treatment is made of waste plastic, and the use of gravels and crushed stones is not necessary, whereby the effect of preserving nature is big. Moreover, reduction of weight of the whole tree-planting ground on the roof can be attained, whereby the structured body for drainage treatment can be attained, whereby the structured body for drainage treatment can be sufficiently used even in the building structure of today.

Furthermore, in the present invention, since the bamboo powder which was developed by the present inventors is used instead of the earth, prevention of destruction of nature can be facilitated and dwirfism of vegetation planted in the tree-planting ground can be planned.

In addition to the effects described above, the tree-planting on the building roofs and the like is beneficial to the increase of supply of oxygen into the air and prevention of the heat island phenomenon, and is effective considerably in saving the thermal energy.

I claim:

1. A structured body for drainage treatment, comprising:
   a top panel having plural weep holes and plural downward cylinders;
   a frame having side panels, plural weep holes in each of the side panels, notch weep holes in a lower edge of each of the side panels and concave and convex connection portions in each of the side panels; and
   a bottom panel having plural concaves in a top face for receiving the downward cylinders.

* * * * *